United States Patent
MacMillian et al.

[11] Patent Number: 5,953,872
[45] Date of Patent: Sep. 21, 1999

[54] FIRE BARRIER ASSEMBLY

[76] Inventors: George S. MacMillian, 611 NW. 109th Ter.; Tracy L. Fields, 957 NW. 82nd Ave., both of Coral Springs, Fla. 33071

[21] Appl. No.: 08/632,707

[22] Filed: Apr. 15, 1996

Related U.S. Application Data

[63] Continuation of application No. 08/397,723, Mar. 2, 1995, abandoned, which is a continuation-in-part of application No. 08/114,496, Aug. 13, 1993, abandoned.

[51] Int. Cl.$^6$ .................................................. E04C 2/52
[52] U.S. Cl. .............................................. 52/220.8; 52/317
[58] Field of Search .................................. 52/232, 220.8, 52/317, 109, 416, 96.21, 201

[56] References Cited

U.S. PATENT DOCUMENTS

| | | | |
|---|---|---|---|
| 1,210,217 | 12/1916 | Schodde | 126/314 |
| 4,124,040 | 11/1978 | Miller | 138/109 |
| 4,823,527 | 4/1989 | Harbeke | 52/232 |
| 4,894,966 | 1/1990 | Bailey et al. | 52/317 |
| 4,901,488 | 2/1990 | Murota et al. | 52/232 |
| 5,105,592 | 4/1992 | MacMillian et al. | 53/232 |
| 5,155,957 | 10/1992 | Robertson et al. | 52/232 |
| 5,263,746 | 11/1993 | Cornwall | 138/109 |
| 5,301,475 | 4/1994 | Stefely | 52/232 |
| 5,309,688 | 5/1994 | Robertson | 52/220.8 |

*Primary Examiner*—Kien T. Nguyen
*Attorney, Agent, or Firm*—Calfee, Halter & Griswold LLP

[57] ABSTRACT

A barrier assembly for blocking the spread of fire and smoke includes a building partition having a partition outer face and having a substantially circular partition opening, the partition opening having a certain opening inner diameter, a plastic pipe having a pipe outer diameter and passing through the partition opening, a tube having a tube outer diameter sized to fit snugly through the partition opening and having a tube inner diameter larger than the outer diameter of the pipe so that there is a substantially annular space between the pipe and the tube, flange means extending from a first end of the tube to abut the partition outer face around the opening, a substantially annular gasket fit into the tube for receiving the pipe acting as a smoke barrier around the pipe, the annular gasket having a gasket inner diameter substantially larger than the pipe outer diameter to permit non-concentric positioning of the pipe within the annular gasket during barrier installation and during pipe adjustment and replacement, and ring of intumescent material located within the substantially annular space between the tube and the pipe for acting as a fire barrier by expanding to close the partition opening and thereby block the passage of fire when fire melts the plastic pipe, the ring of intumescent material having an intumescent material ring inner diameter substantially larger than the pipe outer diameter.

19 Claims, 6 Drawing Sheets

FIRE BARRIER ASSEMBLY

This application is a continuation of application Ser. No. 08/397,723 filed on Mar. 2, 1995 now abandoned which is a continuation-in-part of application Ser. No. 08/114,496 filed on Aug. 31, 1993 now abandoned.

BACKGROUND OF THE INVENTION

1. Field of the Invention

The present invention relates generally to the field of fire safety devices, and more specifically to fire barrier assembly for preventing fire and smoke from spreading from room to room through openings in building partitions for plastic pipes, the assembly including a metal tube having an outer diameter sized to fit snugly through the partition opening and an inner diameter larger than the outer diameter of the pipe so that there is an annular space between the pipe and the metal tube, a flange plate tack welded to a lip extending radially outward from one end of the metal tube to abut the partition around the opening, fastener ports in the flange plate through which fasteners are inserted into the plywood concrete form for the building partition to anchor the assembly in place, an annular gasket fit snugly into the tube and against the flange plate for snugly receiving the plastic pipe to act as a smoke barrier around the pipe, and strips of intumescent material within the annular space between the tube and the pipe extending from the tube toward the pipe but spaced apart from the pipe to permit some lateral variation in pipe location relative to tube location, the intumescent material being provided to act as a fire barrier by expanding to close the partition opening and block the passage of fire when the fire melts the plastic pipe and smoke barrier gasket.

2. Description of the Prior Art

In partitions such as floors, walls and ceilings made of poured concrete it is necessary to have openings for admitting pipes conducting liquids such as water and liquid wastes and the like. In order to prevent fire from spreading from one side of a partition to the other side, such openings must contain fire resistant materials in order to meet existing fire protection codes.

In recent years it has become the practice to use pipes made of plastic, such as polyvinyl chloride instead of steel, cast iron and copper as used in earlier times.

Since plastic pipes become soft, melt and burn at elevated temperatures that normally would not affect metal pipes, it has become necessary to introduce a fire barrier that obturates not only the space around the pipes, but also the empty space remaining after a plastic pipe has melted or burned away.

Several patents have disclosed devices for solving this problem. U.S. Pat. No. 4,796,401, for example, shows a composite fire stop device including a collar that can slide over a plastic pipe and fill the space between the poured concrete and the pipe. The collar includes an intumescent material packed around the collar, and circular tension springs that constrict the pipe as it becomes soft from the heat of the fire, while the intumescent material expands and obturates the void created by the melting pipe. U.S. Pat. No. 4,538,389 shows a fire-break device which includes a two-part collar of substantially incombustible material mounted around the pipe, and a slidable flange filling a space between the pipe and the collar. U.S. Pat. No. 4,221,092 shows a fire barrier including a packing of intumescent material packed into the space between a pipe and the poured concrete.

These prior fire barrier devices have, however, certain disadvantages in that they do not show a self-contained single assembly that can be readily installed on a construction site, and become an integral part of the pipe system. These prior systems also generally restrict the pipe to an exact location relative to the barrier device, needlessly burdening the builder with a requirement for precision installation. Applicants' invention overcomes these problems by providing a self-contained, one piece assembly that is an integral part of a pipe system for fluid-filled and air-vented PVC pipe systems, which has the further advantages of including a metallic casing that allows the firestop material to be replaced if needed, and has no external parts to activate or control intumescent action. Furthermore, it avoids the need for drilling holes in concrete partitions and it avoids unnecessary cutting and splicing of PVC pipe. Finally, there is a space between the pipe and the intumescent material to permit some lateral play in the pipe location relative to the apparatus, to accommodate common construction inaccuracies.

More recently, there is the Fire Barrier Device of the present applicant MacMillan, U.S. Pat. No. 5,105,592, issued on Apr. 21, 1992. This device overcomes many of the problems presented by the existing art, but still has more parts and greater complexity than is necessary to accomplish the intended function.

It is thus an object of the present invention to provide a very simple fire barrier assembly, having a minimal number of parts, which is very inexpensive to manufacture.

It is another object of the present invention to provide such an assembly which may be embodied in a pipe box beneath a bath tub to receive the drain and vent pipes where these pipes converge into a single pipe, to provide a fire barrier in the floor opening for the single pipe.

It is still another object of the present invention to provide such an assembly which accommodates various lateral pipe positions relative to the apparatus to permit minor construction, adjustment and maintenance inaccuracies in apparatus or pipe location.

It is still another object of the present invention to provide such an assembly which is reliable and durable.

It is finally an object of the present invention to provide such an assembly which is easy and inexpensive to install.

SUMMARY OF THE INVENTION

The present invention accomplishes the above-stated objectives, as well as others, as may be determined by a fair reading and interpretation of the entire specification.

A barrier assembly is provided for blocking the spread of fire and smoke, including a building partition having a partition outer face and having a substantially circular partition opening, the partition opening having a certain opening inner diameter, a plastic pipe having a pipe outer diameter and passing through the partition opening, a tube having a tube outer diameter sized to fit snugly through the partition opening and having a tube inner diameter larger than the outer diameter of the pipe so that there is a substantially annular space between the pipe and the tube, flange means extending from a first end of the tube to abut the partition outer face around the opening, a substantially annular gasket fit into the tube for receiving the pipe acting as a smoke barrier around the pipe, the annular gasket having a gasket inner diameter substantially larger than the pipe outer diameter to permit non-concentric positioning of the pipe within the annular gasket during barrier installation and during pipe adjustment and replacement, and ring of intumescent material located within the substantially annular space between the tube and the pipe for acting as a fire barrier by expanding to close the partition opening and thereby block the passage of fire when fire melts the plastic pipe, the ring of intumescent material having ana intumescent material ring inner diameter substantially larger than the pipe outer diameter, to permit nin-concentric positioning of the pipe within the ring of intumescent material during barier installation and during pipe adjustment and replacement.

The assembly preferably includes fastener ports in the flange plate and fasteners for fastening into the concrete deck form boards through the fastener ports to anchor the assembly in place before the concrete floor is placed. A lip preferably extends radially outward from the tube first end to which the flange plate is tack welded.

The assembly may additionally include a pipe box for containing portions of a bath tub drain pipe and a bath tub vent pipe where the drain pipe and vent pipe converge, the pipe box including a drain hole for passing the drain pipe, a second end of the tube being attached to the pipe box around the drain hole. A second lip is preferably formed at the second end of the tube and is attached to the pipe box around the drain hole with tack welds. The pipe box preferably includes a floor plate through which the drain hole is formed and a wall extending upward from the floor plate, and the tube preferably extends below the floor plate. The pipe box also preferably includes a pipe box support leg of a length substantially equal to the length of the tube, extending below the pipe box.

BRIEF DESCRIPTION OF THE DRAWINGS

Various other objects, advantages, and features of the invention will become apparent to those skilled in the art from the following discussion taken in conjunction with the following drawings, in which.

DETAILED DESCRIPTION OF THE PREFERRED EMBODIMENTS

Figure 1:
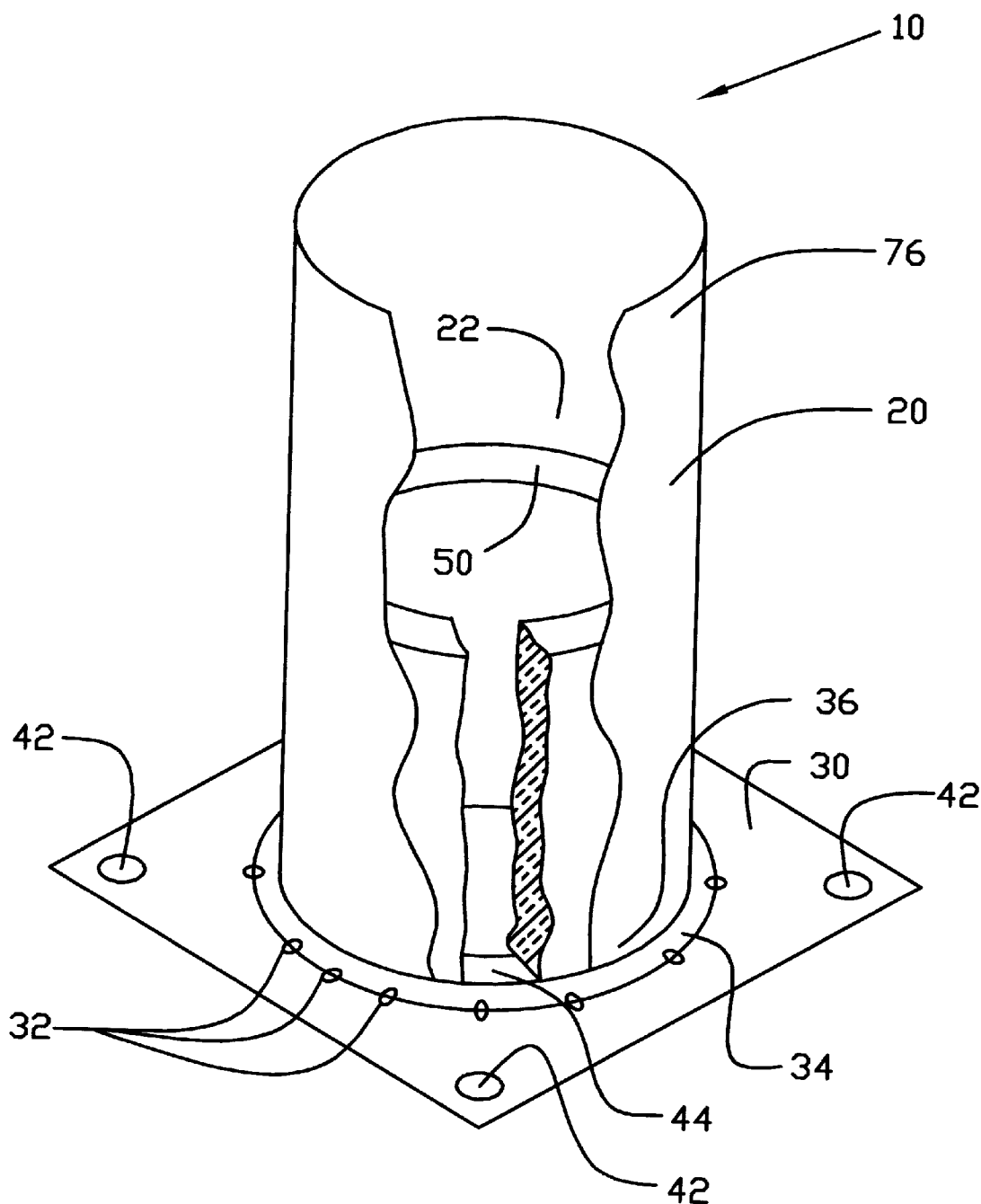
FIG. 1 is a perspective view of the inventive fire and smoke barrier assembly with a segment cut away to reveal the annular gasket and the roll of intumescent material.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

First Preferred Embodiment

Figure 2:
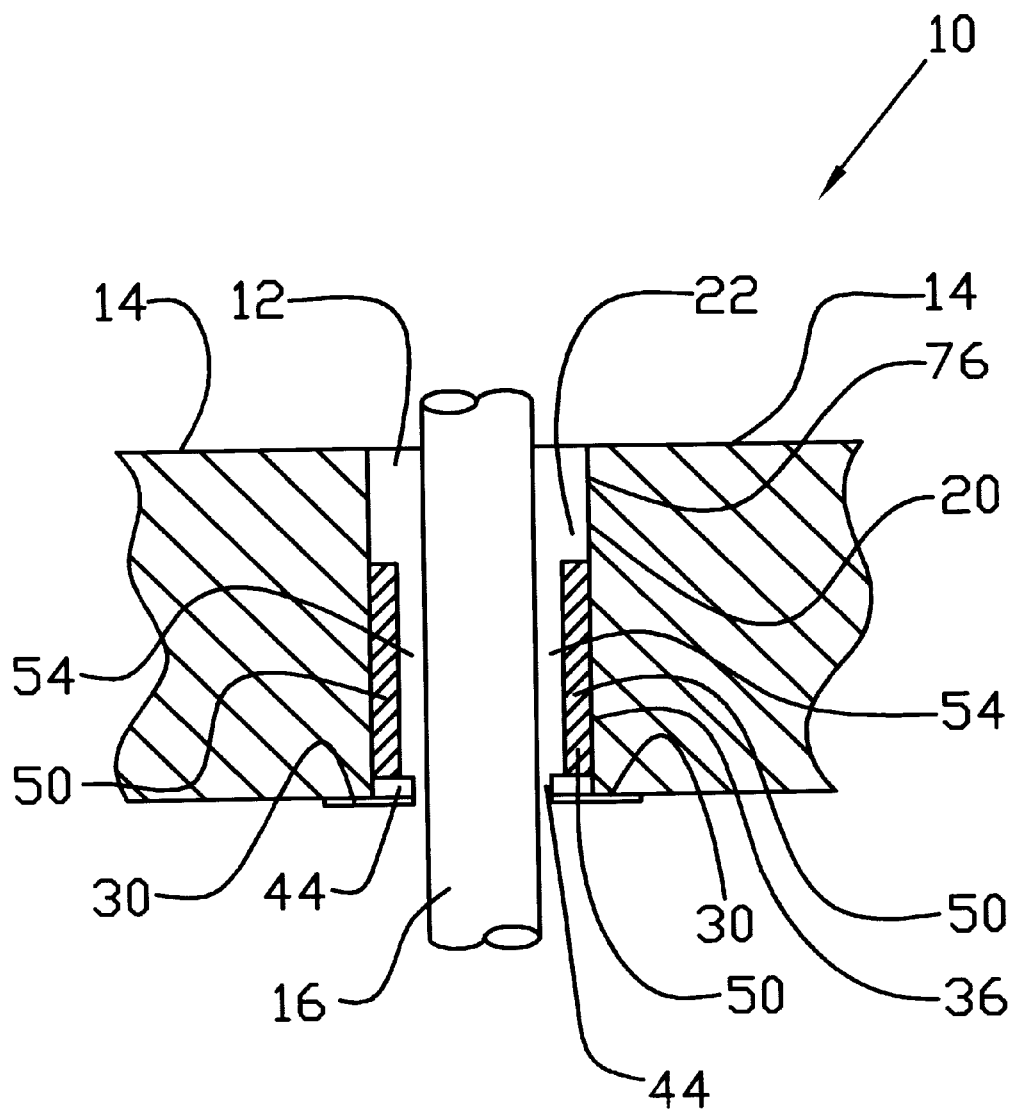
FIG. 2 is a cross-sectional side view of the assembly showing the plastic pipe, the intumescent material and the annular gasket.
Figure 3:
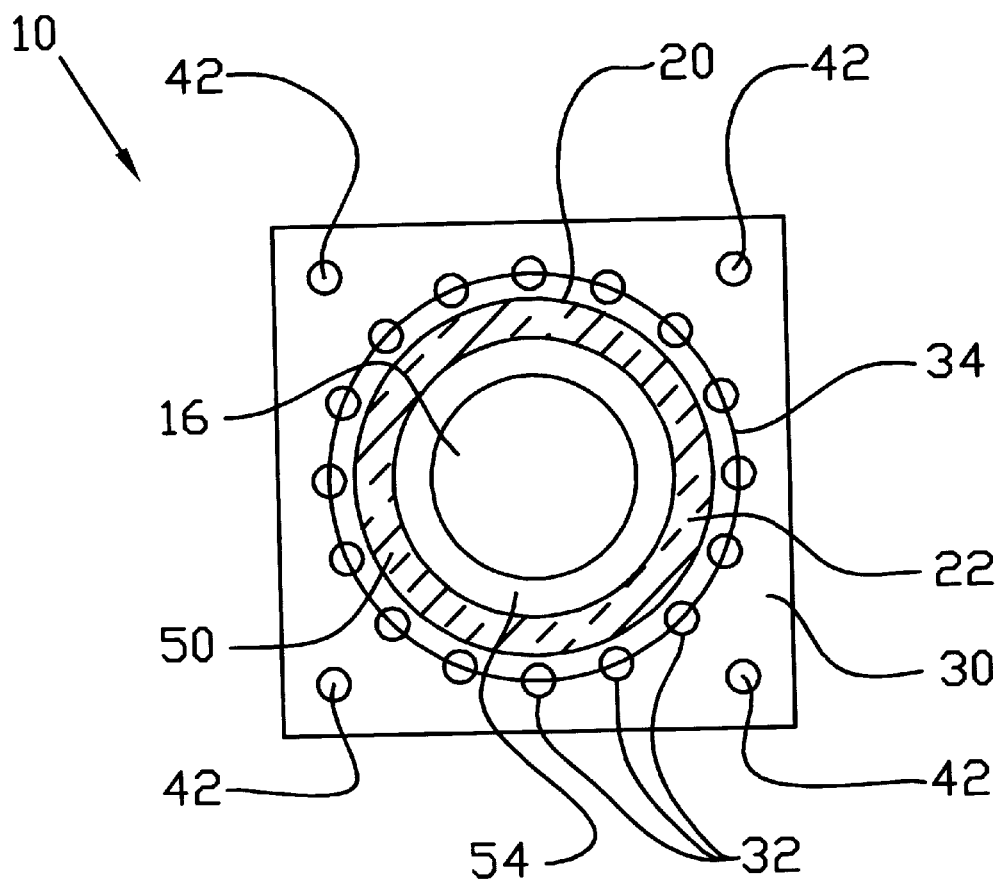
FIG. 3 is a cross-sectional top view of the assembly again showing the intumescent material.

Referring to FIGS. 1–3, a barrier assembly 10 for preventing fire and smoke from spreading from room to room through an opening 12 in a building partition 14 for a standard plastic pipe 16 is disclosed. Partition 14 may be a floor, wall or ceiling.

Assembly 10 includes a metal tube 20 extending trough opening 12 and having an inner diameter larger than the outer diameter of a given plastic pipe 16 so that there is an annular space 22 between pipe 16 and tube 20. Opening 12 is sized relative to tube 16 to snugly receive tube 16. A flange plate 30 is attached by tack welds 32 to a first lip 34 extending radially outward from a first end 36 of metal tube 20, for abutting partition 14 around opening 12. Fastener ports 42 are provided in flange plate 30 through which fasteners are inserted into the concrete form for partition 14 to anchor assembly 10 in place. An annular or O-ring gasket 44 fits snugly into tube 20 and against flange plate 30 for snugly or lossely receiving pipe 16 and permitting non-concentric positioning of pipe 16 with gasket 44. Gasket 44 acts as a smoke barrier around pipe 16 and is preferably formed of rubber. A roll of intumescent material 50 is provided within annular space 22 between tube 20 and pipe 16. Intumescent material 50 extends from the inner surface of tube 20 inwardly toward pipe 16, but is spaced apart from pipe 16 by an annular lateral play accommodation space 54. Material 50 is provided to act as a fire barrier by expanding in the presence of fire to close partition opening 12. Material 50 expands to block the passage of fire, heat and smoke through opening 12 when the fire melts plastic pipe 16 and gasket 44.

Pipe 16 is typically formed of polyvinyl chloride, but the invention is in no way limited to this type of plastic pipe. Opening 12 and pipe 16 are typically of circular cross-section, but the cross-sectional shape of assembly 10 can be adapted to accommodate other shapes as well. While intumescent material 50 preferably fills annular space 22 prior to expansion, it is understood that it need not completely fill space 22 prior to expansion to function properly as a fire barrier.

Second Preferred Embodiment

Figure 4:
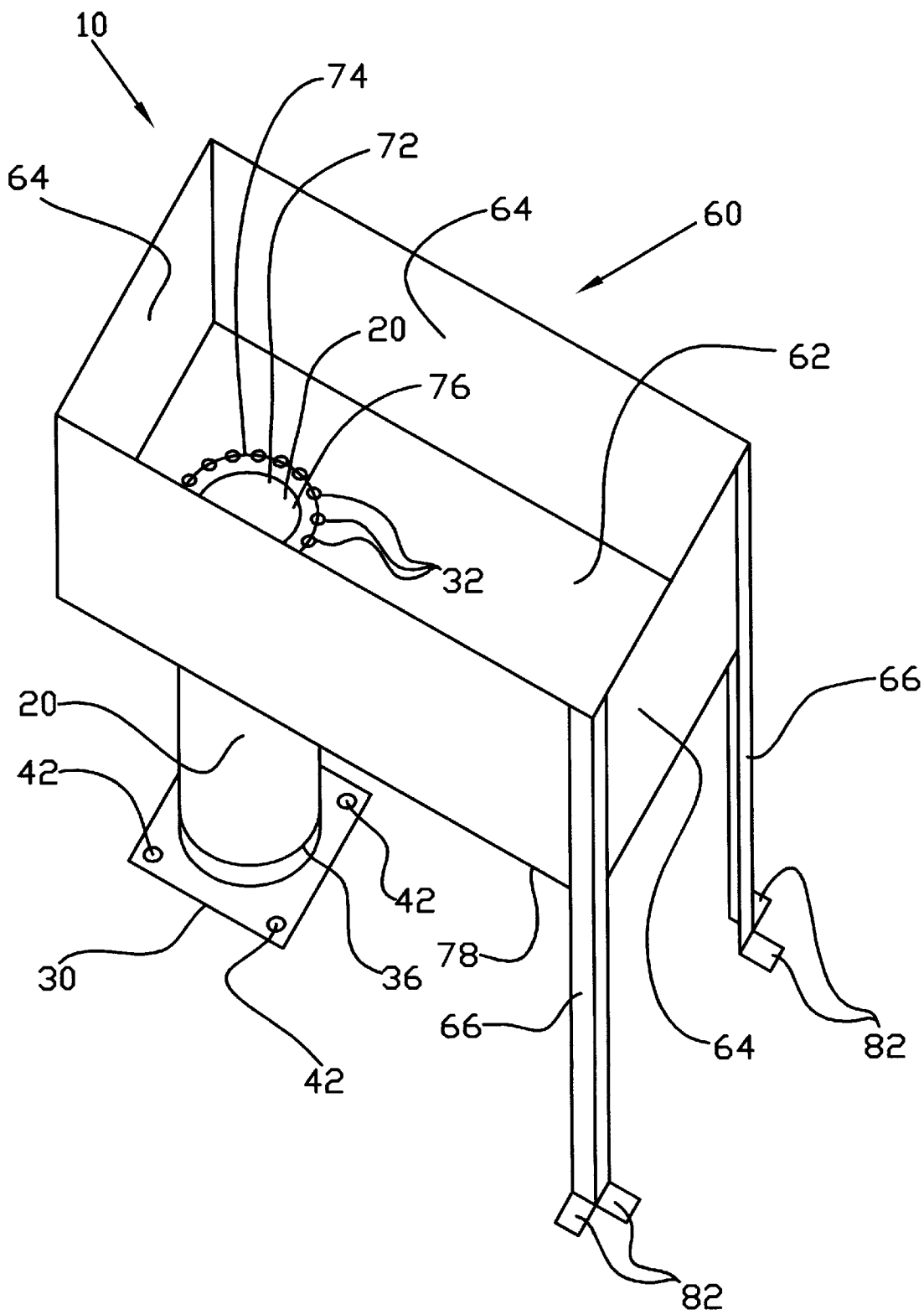
FIG. 4. is a perspective view of the second embodiment with the assembly joined to a pipe box for use below a bath tub.
Figure 5:
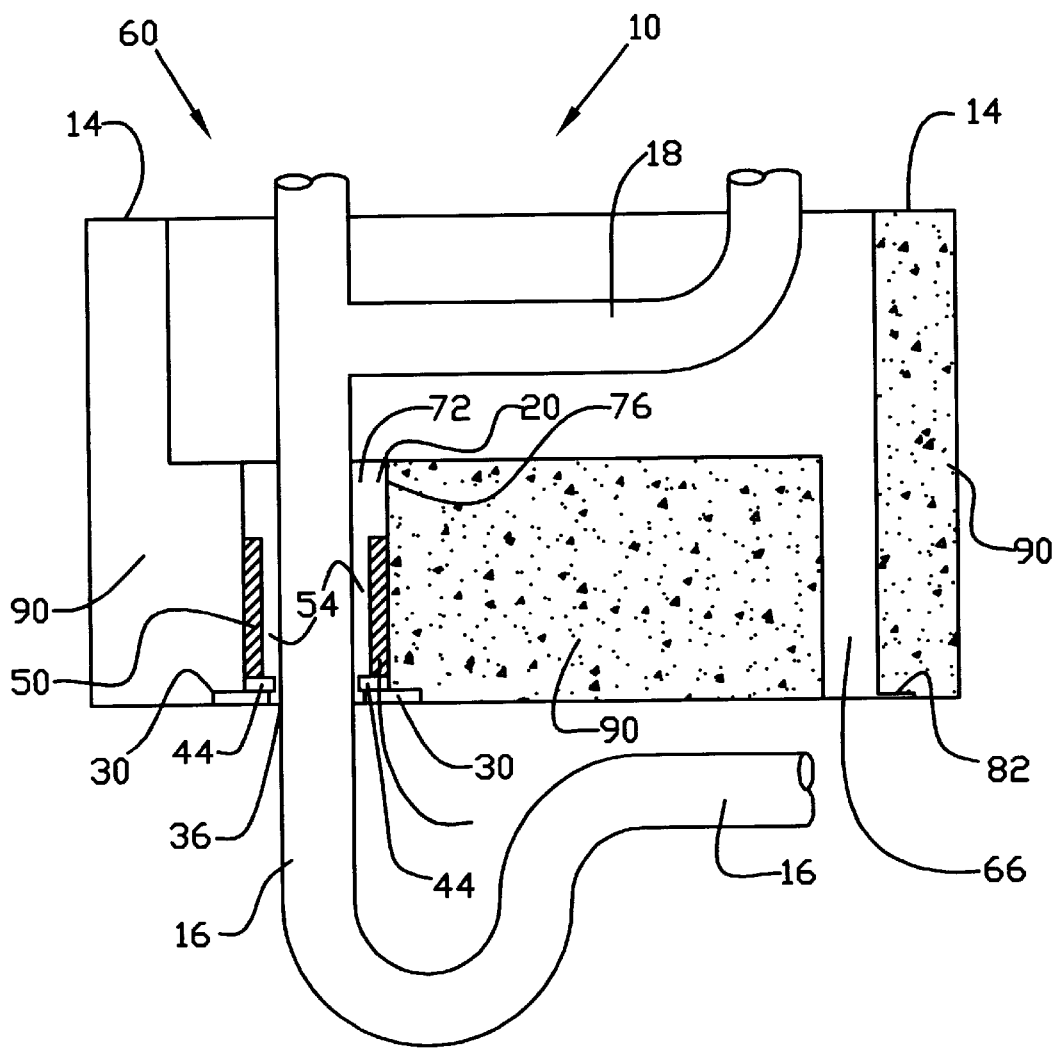
FIG. 5 is a cross-sectional side view of the embodiment of FIG. 4 installed in a concrete floor partition showing the bath tub drain and vent pipes.
Figure 6:
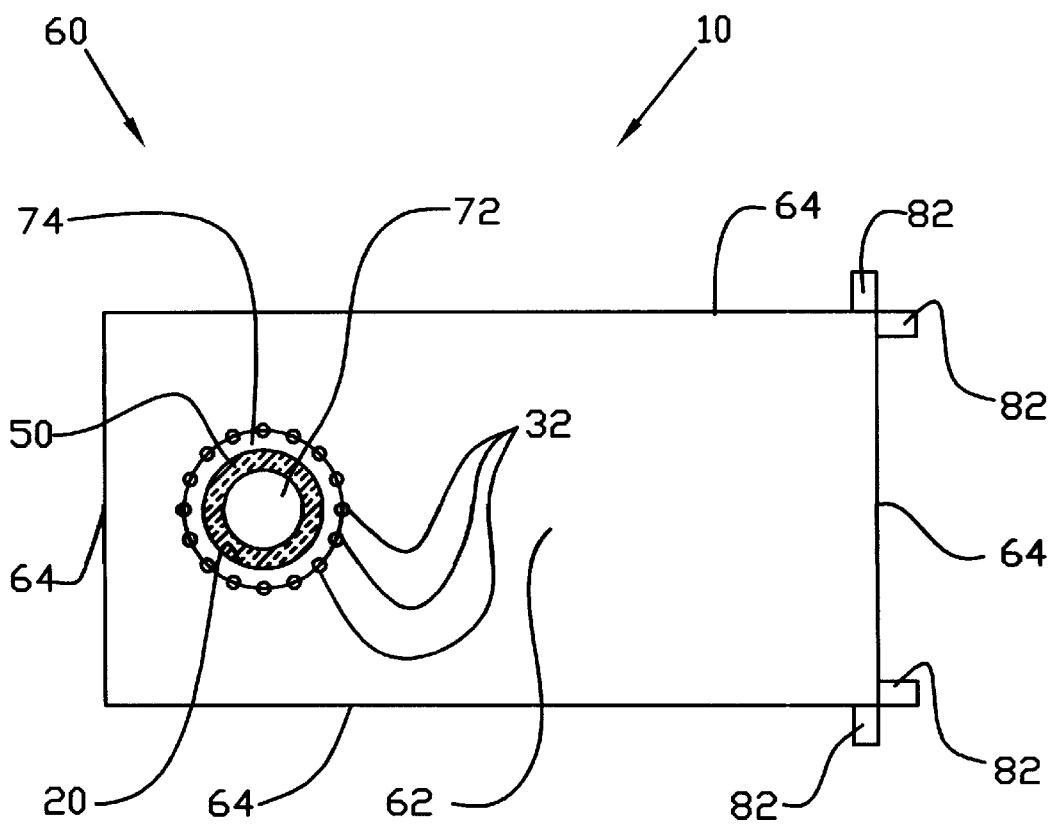
FIG. 6 is a top view of the embodiment of FIG. 4.

The second preferred embodiment adds structure to the first embodiment to make it suited for use with a bath tub drain pipe 16. Pipe box 60 is provided to contain the juncture where a overflow drain pipe 16 joins tub drain pipe 18. See FIGS. 4–6. Pipe box 60 preferably includes an elongate rectangular floor plate 62 with peripheral side walls 64 and support legs 66 below two corners at one end of floor plate 62. A drain hole 72 is provided toward the other end of floor plate 62. A second lip 74 is formed at the second end 76 of tube 20 and is tack welded to the bottom face 78 of floor plate 62 around drain hole 72. The lengths of legs 66 substantially equal the length of tube 20, so that pipe box 60 stands in a level position. Legs 66 preferably include feet portions 82 for enhanced stability. Pipe box 60 is cast in concrete 90 below drain pipe 18 and overflow drain pipe 16 according to well known methods before the bath tub is installed. Pipe box 60, as well as tube 20 and flange plate 30, are all preferably formed of galvanized steel sheet having a 26 gauge minimum thickness.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim as our invention:

1. A barrier assembly for blocking the spread of fire and smoke through a building partition, the building partition having an outer face, an inner face and a partition opening through which a pipe passes, comprising:

a tube having a tube outer diameter sized to fit snugly through said partition opening and having a tube inner diameter, larger than said outer diameter of said pipe, a substantially annular space between said pipe and said tube;

a flange extending from a first end of said tube to abut said partition outer face around said partition opening, a flexible, substantially annular gasket having inner and outer diameters fit snugly into said tube, adjacent said flange, for snugly receiving the pipe therein to form a smoke barrier with said pipe, said gasket outer diameter being substantially larger than said pipe outer diameter to permit non-concentric positioning of said pipe within said annular gasket during barrier installation and during pipe adjustment and replacement, and a ring of intumescent material located within said substantially annular space, between said tube and said pipe, adjacent said gasket, for acting as a fire barrier by expanding to fill the substantially annular space and close said partition opening and thereby block the passage of fire, said ring of intumescent material having a ring outer diameter substantially equal to an inner diameter of said tube and a ring inner diameter substantially larger than said pipe outer diameter, to permit non-concentric positioning of said pipe within said ring of intumescent material during barrier installation and during pipe adjustment and replacement.

2. An assembly according to claim 1, additionally comprising:

fastener ports in said flange, and fasteners for inserting into boards for forming said partition through said fastener ports to anchor said assembly in place.

3. An assembly according to claim 1, additionally comprising a lip extending radially outward from said tube first end to which said flange is tack welded.

4. An assembly according to claim 1 wherein said gasket is formed of rubber.

5. A fire barrier assembly according to claim 1, wherein said gasket inner diameter is substantially equal to said pipe outer diameter.

6. A fire barrier assembly according the claim 1, wherein said gasket inner diameter is smaller than said pipe outer diameter.

7. A fire barrier assembly useful for blocking the spread of fire and smoke through a drain hole through which a bath tub drain pipe passes, comprising:

a pipe box for containing portions of a bath tub drain pipe and a bath tub vent pipe where said drain pipe and said vent pipe converge, said pipe box having an open top and comprising a floor plate and sidewalls, said floor plate having a drain hole therein, first and second support legs attached to said pipe box at one end of said pipe box, a tube adapted to fit snugly through said drain hole and around said drain pipe, a substantially annular space between said drain pipe and said tube, a flange extending from a first end of said tube for attachment to a partition upon which said fire barrier assembly stands, a flexible, substantially annular gasket having inner and outer diameters fit snugly into said tube, adjacent said flange, for receiving said drain pipe, said gasket inner diameter substantially larger than said drain pipe outer diameter and said gasket outer diameter being substantially larger than said drain pipe outer diameter to permit non-concentric positioning of said drain pipe within said annular gasket during barrier installation and during drain pipe adjustment and replacement, a ring of intumescent material located within said substantially annular space, between said tube and said drain pipe, adjacent said gasket, for acting as a fire barrier by expanding to close said partition opening and thereby block the passage of fire, said ring of intumescent material having a ring outer diameter substantially equal to an inner diameter of said tube and a ring inner diameter substantially larger than said drain pipe outer diameter, to permit non-concentric positioning of said drain pipe within said ring of intumescent material during barrier installation and during drain pipe adjustment and replacement.

8. A fire barrier assembly according to claim 7, wherein said tube further comprises a lip formed at a second end of said tube, said lip attached to said floor plate around said drain hole with tack welds.

9. An assembly according to claim 7, wherein said pipe box comprises a floor plate through which said drain hole is formed and a wall extending upward from said floor plate, and wherein said tube extends below said floor plate.

10. An assembly according to claim 9 additionally comprising:

a pipe box support leg of a length substantially equal to the length of said tube, extending below said pipe box.

11. A barrier assembly for blocking the spread of fire and smoke through a building partition, the building partition having an outer face, an inner face and a partition opening through which a pipe passes, said partition opening having a certain opening inner diameter, comprising:

a tube having a tube outer diameter sized to fit snugly through said partition opening substantially from said outer face to said inner face and having a tube inner diameter larger than said outer diameter of said pipe, a substantially annular space between said pipe and said tube, a flange extending from a first end of said tube to abut said partition outer face around said partition opening, a flexible, substantially annular gasket having inner and outer diameters fit snugly into said tube, adjacent said flange, for snugly receiving the pipe therein to form a smoke barrier with said pipe, said gasket outer diameter being substantially larger than said pipe outer diameter to permit non-concentric positioning of said pipe within said annular gasket during barrier installation and during pipe adjustment and replacement, and a ring of intumescent material located within said substantially annular space, between said tube and said pipe, adjacent said gasket, for acting as a fire barrier by expanding to fill the substantially annular space and close said partition opening and thereby block the passage of fire, said ring of intumescent material having a ring outer diameter substantially equal to an inner diameter of said tube and a ring inner diameter substantially larger than said pipe outer diameter, to permit non-concentric positioning of said pipe within said ring of intumescent material during barrier installation and during pipe adjustment and replacement.

12. An assembly according to claim 11 wherein said gasket is formed of rubber.

13. A barrier assembly for blocking the spread of fire and smoke through a building partition, the building partition having an outer face, an inner face and a partition opening through which a pipe passes, said partition opening extending from, said partition outer face to said partition inner face and having a certain opening inner diameter, comprising:

a tube having a tube outer diameter sized to fit snugly into said partition outer face and along said partition opening toward said partition inner face and having a tube inner diameter larger than said outer diameter of said pipe, a substantially annular space between said pipe and said tube, a flange extending from a first end of said tube to abut said partition outer face around said partition opening, a flexible, substantially annular gasket having inner and outer diameters fit snugly into said tube, adjacent said flange, for snugly receiving the pipe therein to form a smoke barrier with said pipe, said gasket outer diameter being substantially larger than said pipe outer diameter to permit non-concentric positioning of said pipe within said annular gasket during barrier installation and during pipe adjustment and replacement, and a ring of intumescent material located within said substantially annular space, between said tube and said pipe, adjacent said casket, for acting as a fire barrier by expanding to fill the substantially annular space and close said partition opening and thereby block the passage of fire, said ring of intumescent material having a ring outer diameter substantially equal to an inner diameter of said tube and a ring inner diameter substantially larger than said pipe outer diameter, to permit non-concentric positioning of said pipe within said ring of intumescent material during barrier installation and during pipe adjustment and replacement.

14. An assembly according to claim 13 wherein said gasket is formed of rubber.

15. A barrier assembly useful for blocking the spread of fire and smoke through a building partition, said building partition having an outer face, an inner face and a partition opening through which a pipe passes, comprising:

a tube having a tube outer diameter sized to fit snugly through said partition opening and having a tube inner diameter larger than said outer diameter of said pipe so that there is a substantially annular space between said pipe and said tube, a flange extending from a first end of said tube to abut said outer face around said partition opening, a flexible, substantially annular gasket fit snugly into said tube, adjacent said flange, for receiving said pipe, said gasket having an inner diameter substantially larger than said pipe outer diameter and an outer diameter substantially larger than the pipe outer diameter to permit non-concentric positioning of said pipe within said annular gasket during barrier installation and during pipe adjustment and replacement, and a ring of intumescent material located within said substantially annular space, between said tube and said pipe, adjacent said gasket, for acting as a fire barrier by expanding to close said partition opening and thereby block the passage of fire, said ring of intumescent material having a ring outer diameter substantially equal to an inner diameter of said tube and a ring inner diameter substantially larger than said pipe outer diameter, to permit non-concentric positioning of said pipe within said ring of intumescent material during barrier installation and during pipe adjustment and replacement.

16. A fire barrier assembly useful for blocking the spread of fire and smoke through a drain hole through which a bath tub drain pipe passes, comprising:

a pipe box for containing portions of a bath tub drain pipe and a bath tub vent pipe where said drain pipe and said vent pipe converge, said pipe box having an open top and comprising a floor plate and sidewalls, said floor plate having a drain hole therein, first and second support legs attached to said pipe box at one end of said pipe box, a length of said first support leg being substantially equal to a length of said second support leg, a tube adapted to fit snugly through said drain hole and around said drain pipe so that there is a substantially annular space between said drain pipe and said tube, said tube having a height, said height being substantially equal to said length of said first support leg and said length of said second support leg, a flange extending from a first end of said tube for attachment to a partition upon which said fire barrier assembly stands, a flexible, substantially annular gasket fit snugly into said tube, adjacent said flange, for snugly receiving said drain pipe therein to form a smoke barrier with said drain pipe, said gasket having an outer diameter substantially larger than said drain pipe outer diameter to permit non-concentric positioning of said drain pipe within said annular gasket during barrier installation and during drain pipe adjustment and replacement a ring of intumescent material located within said substantially annular space, between said tube and said drain pipe, adjacent said gasket, for acting as a fire barrier by expanding to close said partition opening and thereby block the passage of fire, said ring of intumescent material having a ring outer diameter substantially equal to an inner diameter of said tube and a ring inner diameter substantially larger than said drain pipe outer diameter, to permit non-concentric positioning of said drain pipe within said ring of intumescent material during barrier installation and during drain pipe adjustment and replacement.

17. A fire barrier assembly according to claim 16, wherein said tube further comprises a lip formed at a second end of said tube, said lip attached to said floor plate around said drain hole with tack welds.

18. A fire barrier assembly according to claim 16, wherein said gasket inner diameter is substantially equal to said drain pipe outer diameter.

19. A fire barrier assembly according to claim 16, wherein said gasket inner diameter is smaller than said drain pipe outer diameter.

* * * * *